March 2, 1948.  M. L. BENJAMIN ET AL  2,436,848
CHUCK
Filed Dec. 5, 1945
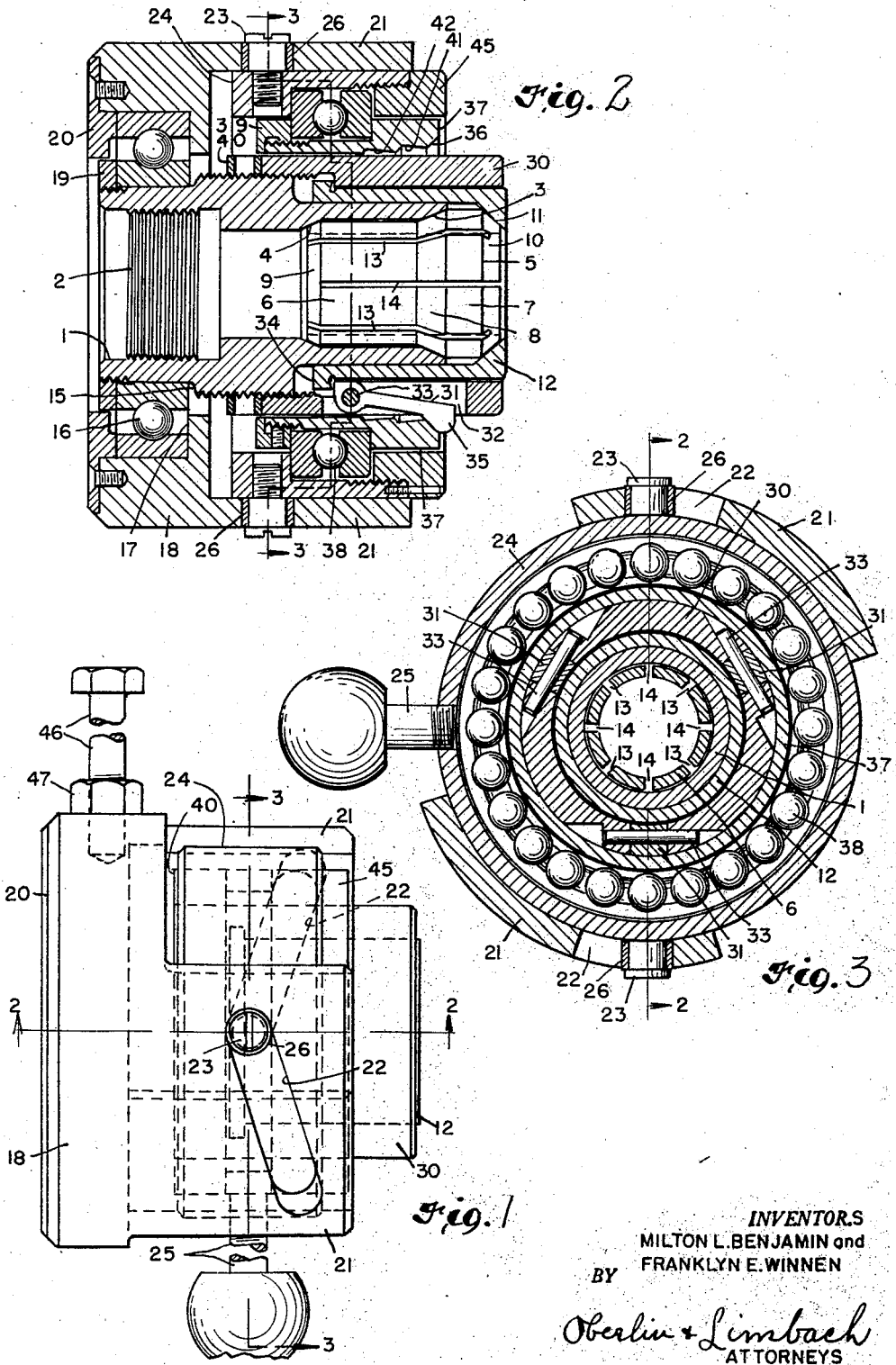
INVENTORS
MILTON L. BENJAMIN and
FRANKLYN E. WINNEN
BY
Oberlin & Limbach
ATTORNEYS Patented Mar. 2, 1948

2,436,848

UNITED STATES PATENT OFFICE 2,436,848

CHUCK

Milton L. Benjamin, Shaker Heights, and Franklyn E. Winnen, Cleveland, Ohio; said Winnen assignor to said Benjamin Application December 5, 1945, Serial No. 632,894

7 Claims. (Cl. 279—52)

The present invention, relating as indicated to chucks, has more particular regard to chucks of the type in which a tap or like tool, or workpiece, is gripped by a contractible and expansible collet. Still more particularly the invention contemplates the provision of improved manually operable means for opening and closing the chuck.

One principal object of the invention is to provide such a manually operable chuck which will be simple and compact in construction and at the same time be positive and accurate in operation. A further object is to provide a chuck of the type in question which may be readily mounted in any standard drill press or like machine in which chucks are regularly used. Still a further object is to provide a chuck in which the closing action will be positive and the tool or work-piece will be held securely by the collet for rotation in either direction and without further attention on the part of the operator until it is desired to release such tool or work-piece; such roation being permitted at high speed, since no load is imposed on the ball bearings in the chuck.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a top plan view of a chuck embodying our present improvements;

Fig. 2 is a central axial section of the same, as indicated by the line 2—2 Fig. 1; and Fig. 3 is a transverse section of said chuck taken on the plane indicated by the line 3—3 Figs. 1 and 2.

It should be noted that in the case of the chuck thus illustrated in the several figures of the drawing, the construction of the collet and the parts immediately associated therewith for contracting such collet is substantially the same as that set forth in U. S. Patent No. 2,228,685, issued to one of the applicants, viz., M. L. Benjamin, under date of January 14, 1941. It will be understood, of course, that the means herein shown and described for effecting such actuation may be utilized, although not so advantageously, with other forms of collet.

Referring now to the construction as illustrated in the several figures of the drawing, the main element of the chuck will be seen to comprise a hollow cylindrical member or sleeve 1, this corresponding in general with the forward hollow portion of the so-called "shank member" of the chuck set forth in the identified patent. While as shown, said member 1 is provided at its rear end with internal threads 2 whereby it may be mounted on a correspondingly externally threaded spindle (not shown), it will be understood that such end of the member may equally well consist of a shank suitable for connection to a socketed driving member.

The interior wall or bore of member 1 lying forwardly of such threaded rear portion 2 is formed with two substantially parallel axially spaced conical surfaces 3 and 4, which flare outwardly, i. e., toward the forward end of the member, the first such surface being in fact directly contiguous to such end. The collet 5, which is mounted within the portion of member 1 just described, is formed externally with two axially spaced cylindrical surfaces 6 and 7 which are joined by a conical surface 8 complementary to and designed to coact with conical surface 3 of member 1; and with a conical surface 9 at its inner end complementary to and designed to coact with conical surface 4 on said member. In other words, said conical faces 8 and 9 are parallel and are inclined at the same angle and spaced substantially the same distance apart as the internal conical faces of the member 4. In addition, the collet at its forward end is provided with a conical face 10 which inclines at an angle opposite to that of the previously described conical faces and is adapted to be engaged by an inwardly directed conical face 11 on a nose-piece 12. Finally, it should be noted that the collet is longitudinally intersected by slots 13 and 14 which extend alternately from opposite ends thereof almost to the other end, so that upon relative axial movement of member 1 and nose-piece 12, the collet will be contracted and thus caused to grip the stem or shank of a tool inserted within the same or similarly to grip a work-piece, if desired. It will be understood that the collet will be made of tempered steel or equivalent metal, so that upon such contracting pressure being released, it will expand and resume its normal shape or diameter. The camming action of the several complementary conical faces will be such as to cause such contraction to be substantially uniform throughout the length of the collet without any longitudinal distortion of any section thereof.

For the purpose of reciprocating the nose-piece 12 so as to effect contraction of the collet 5, as just set forth, the means now to be described are provided.

Mounted externally on the rear end of member 1 so as to abut an externally directed shoulder 15 thereon is the inner raceway of a ball bearing 16, the outer raceway of which similarly abuts against an inwardly directed flange 17 of an outer casing 18. A ring 19, externally threaded on the rear portion of member 1, serves to hold the races of the ball bearing thus in abutting relation with the shoulder and flange just referred to while an annular plate 20 secured to the rear face of casing 18 serves to enclose such ball bearing so as to prevent entrance of foreign matter therein and retain lubricant if desired.

The casing 18, as best shown in Figs. 1 and 3, includes two transversely arcuate, forwardly extending portions 21, 21 which are radially spaced from the forward portion of member 1 and terminate somewhat short of the outer end of the latter in which the collet 5 is fitted, as described above. Each such extension 21 of casing 18 is formed with an inclined slot 22 in which are received radial studs 23 projecting from a cylindrical shell or cam sleeve 24 that is fitted within said extensions so as to be capable of both rotative and longitudinal movement relative thereto. Such movement is imparted to shell 24 by means of a radial handle or knob 25 that projects therefrom in one of the spaces between the two extensions 21, since by rotating such handle the studs 23 will be caused to move in the cam slots 22 in a corresponding direction and thus at the same time displace the shell longitudinally of the axis of the device in one direction or the other. To facilitate such movement, the studs 23 are desirably proved with rollers 26 at the points where they thus engage slots 22.

Threadedly secured at its inner end to the intermediate portion of member 1, i. e., at a point lying to the rear of the innermost path of movement of nose-piece 12, is a second cylindrical shell 30 which constitutes a carrier for a plurality (three as shown) of dogs or levers 31. The latter lie in longitudinal slots 32 spaced equal distances apart about shell 30 and are oscillatorily held in such slots by transverse pivot pins 33 adjacent their inner ends. The inner end of each lever (see Fig. 2) is of angular form so as to be adapted to bear against an outwardly directed flange 34 on the inner end of nose-piece 3, such flange presenting a complementarily angled face to such lever ends. The outer ends of the levers on the other hand are formed with rounded projections 35 which have camming engagement with the outwardly bevelled face 36 of a ring 37 rotatably held within shell 24.

Such rotatable mounting for ring 37 is provided by a ball bearing 38, one race of which abuts a shoulder on the ring while the other is held in place by a flange 39 that has exterior threaded engagement with the rear end of said ring 37. Such last-mentioned ball race also abuts against an inwardly directed shoulder on shell 24. Accordingly it will be seen that the ball bearing 38 is disposed so as to take up longitudinal thrust between said shell 24 and ring 37, while at the same time leaving the latter entirely free to rotate within said shell as well as about shell 30 when the latter is non-rotatably secured to the nose-piece by the camming action of the levers 35.

It will be noted that the degree of oscillation of said levers required to move the nose-piece a given amount may be adjusted by rotation of shell 30 about the intermediate portion of the member 1 with which it has threaded engagement, as previously described. In order to hold said ring in such adjusted position, a locking ring 40, engaging the same threads on the member 1, is provided. Access to this locking ring with a spanner or like operating tool may be had through the spaces that lie between extensions 21 of casing 20. It will also be noted that in addition to the outwardly flaring bevel 36 on ring 37 the latter is formed with two successively adjacent oppositely inclined bevel faces 41 and 42 wherewith the rounded projections 35 on cam levers 31 may be successively caused to engage by longitudinal movement of ring 37. The effective diameter of the bevel face 41 on ring 37 is slightly greater than that of the bevel face 42, as a result of which it will be seen that correspondingly different degrees of inwardly directed pressure may be exerted on the nose-piece 30 through engagement of such faces with the cam levers 31. It will be obvious that only one such bevel face will serve where such variation in degree of pressure is not required, or the number of steps may be more than the two shown.

A shouldered ring 45 threadedly engaged within the forward portion of shell 24 serves to close off the corresponding side of the ball bearing 38, such ring constituting in effect a part of the shell in question. Means will also be desirably provided whereby when the chuck is secured in a machine the casing 18 will be held against rotation. Such means, as illustrated, may take the place of a radially extending rod or bolt 46 that is threaded to the main body of the casing, being secured in place by means of a lock nut 47.

From the foregoing description of the construction and operation of the several component parts of our improved chuck, the operation of the chuck as a whole will be readily apparent. When the chuck is set up for operation for use in a machine, the tool or other part to be held therein is inserted within the collet while the latter is in its normal expanded condition. Thereupon by rotating handle or knob 25 the cam sleeve or shell 24 is moved longitudinally forwardly relatively to the casing 18 and member 1, between which such sleeve is rotatably, as well as thus longitudinally, movably supported. The effect of such movement of the sleeve will be to press the outer rounded ends of the lever arms 31 inwardly thereby rocking the levers about their pivots and pressing their inner angular ends against the outwardly directed flange 34 on the nose-piece 3. Corresponding inward movement is therefore imparted to such nose-piece, sufficient to cause the latter to contract the collet into firm gripping engagement with the tool or work-piece that has been inserted therein. The forward longitudinal movement of the cam sleeve is continued until the rounded outer ends of the levers engage one or the other of the oppositely inclined bevel faces 41 and 42 on said sleeve, whereby the levers will be retained in corresponding set position. Due to the difference in the diameter of such bevel faces 41 and 42, the degree of pressure exerted by the inner ends of the levers on the flange of the nose-piece may be correspondingly varied. When it is desired to release the tool or work-piece, all that is required is to move the handle or knob 25 in the reverse direction, whereupon the cam sleeve is moved inwardly so as to release such rounded lever ends. Due to the resilience of the collet the latter will then return the nose-piece to its normal inoperative position, the tool or work-piece may be removed from the chuck, and the latter is ready for another operation.

Not only may the chuck be utilized to hold a tool or individual work-piece, but due to its construction it is adapted equally for the handling of a continuous work-piece, since such may be fed intermittently through the hollow interior of the chuck so as to present successive sections to a working tool in a machine equipped with such chuck.

It should also be noted that the lever arms 31 give equalized pressure on nose-piece flange 34, due to the fact that there is clearance between parts 37 and 24, such equalization of pressure being further insured by employing three such arms equally spaced circumferentially about the nose-piece.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, a shell surrounding said nose-piece and supported by said member, lever arms carried by said shell and having operative engagement with said nose-piece, and means supported by said casing whereby said lever arms may be actuated.

2. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, lever arms carried by said shell and disposed to engage said last-mentioned flange on said nose-piece, and means supported by said casing whereby said lever arms may be actuated.

3. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, lever arms carried by said shell and disposed to engage said last-mentioned flange on said nose-piece, and a cam sleeve reciprocably supported by said casing adapted to engage and actuate said levers.

4. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, lever arms carried by said shell and disposed to engage said last-mentioned flange on said nose-piece, a cam sleeve rotatably and reciprocably mounted within said casing adapted to engage and actuate said levers upon being reciprocated, and means adapted thus to reciprocate said sleeve.

5. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, lever arms carried by said shell and disposed to engage said last-mentioned flange on said nose-piece, and a sleeve reciprocably supported by said casing having a bevel face disposed to engage and actuate said levers and a second, oppositely inclined bevel face adapted to retain said levers in position following such actuation thereof.

6. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, lever arms carried by said shell and disposed to engage said last-mentioned flange on said nose-piece, and a sleeve reciprocably supported by said casing having a bevel face disposed to engage and actuate said levers and a plurality of oppositely inclined bevel faces of differing diameter adapted to retain said levers in position following such actuation thereof.

7. In a chuck, the combination of a hollow cylindrical supporting member, a contractible collet reciprocably mounted therein, said member and collet being formed with coacting faces whereby the latter is contracted upon movement thereof inwardly of the former, and means for thus moving said collet, said means comprising a nose-piece surrounding said member and reciprocable longitudinally thereof, an inwardly directed flange on said nose-piece engaging the outer end of said collet, a surrounding casing rotatably connected with said member but held against longitudinal movement relatively thereto, an outwardly directed flange on said nose-piece, a shell surrounding the latter and supported by said member, said shell being formed with a plurality of circumferentially spaced, longitudinal slots, levers transversely pivoted in such slots having their inner ends disposed to engage said last-mentioned flange on said nose-piece and their outer ends in the form of rounded projections, and a sleeve reciprocably supported by said casing having a bevel face adapted to engage such projections on said levers to rock the latter.

MILTON L. BENJAMIN.
FRANKLYN E. WINNEN.

REFERENCES CITED

The following references are of record in the file of this patent:

UNITED STATES PATENTS

| Number | Name | Date |
|---|---|---|
| 1,818,305 | Class | Aug. 11, 1931 |
| 2,228,685 | Benjamin | Jan. 14, 1941 |
| 2,345,069 | Phillips | Mar. 28, 1944 |
| 2,364,212 | Hines | Dec. 5, 1944 |
| 2,383,156 | Phillips | Aug. 21, 1945 |
| 2,397,159 | Schneider | Mar. 26, 1946 |